United States Patent Office 2,985,633
Patented May 23, 1961

2,985,633

POLYMERIZATION OF ETHYLENE WITH ORGANOBORON COMPOUNDS TREATED WITH OXYGEN

Frank J. Welch, South Charleston, W. Va., assignor to Union Carbide Corporation, a corporation of New York No Drawing. Filed Oct. 30, 1958, Ser. No. 770,591

7 Claims. (Cl. 260—85.3)

This invention relates to the polymerization of ethylene. More particularly, it relates to the use of oxygen-treated organoboron compounds for the homopolymerization of ethylene and the copolymerization thereof with organic ethylenically unsaturated compounds.

Heretofore, it has been known that ethylene can be polymerized by free radicals produced upon the thermal decomposition of such substances as peroxides and azo compounds. Also, more recently, it has been shown that ethylene can be polymerized by the use of various metal alkyls in combination with metallic halides, said catalyst compositions being known generally as Ziegler-type catalysts.

It has now been found that certain organoboron compounds which have been treated with oxygen are active catalysts for the polymerization of ethylene. The oxygen-treated organoboron catalyst compositions of this invention greatly increase both the rate of polymerization of ethylene and the product yield over that obtained by the use of boron compounds which have not been treated with oxygen to an extent over and above that which would prevail from a purely additive effect. The oxygen-treated organoboron catalyst compositions of this invention are soluble in most organic solvents and are highly stable at room temperature in contrast to the insolubility and instability of the Ziegler catalysts. The active polymerization catalysts of this invention are readily obtained by contacting the organoboron compounds with air or oxygen.

The organoboron compounds which are treated with oxygen to produce the catalyst compositions of this invention are those compounds which are represented by the general formula:

wherein X represents a halogen atom; an ether containing radical such as —OR$_2$ and

or a monovalent hydrocarbon radical, i.e., —R$_2$; and each of —R, —R$_1$, —R$_2$, and —R$_3$ is a monovalent hydrocarbon radical. The monovalent hydrocarbon radical can be a saturated alkyl radical containing from 1 to about 12 carbon atoms; a cycloalkyl radical containing from 3 to about 12 carbon atoms; or an aromatic hydrocarbon radical containing from about 6 to about 10 carbon atoms in the aromatic ring. Among the halogen atoms which X can represent are chlorine, fluorine, or bromine. Suitable alkoxy radicals are methoxy, ethoxy, propoxy, isopropoxy, butoxy, tert-butoxy, hexoxy, 2-ethylhexoxy, decoxy, and the like. Illustrative monovalent hydrocarbon radicals are methyl, ethyl, isopropyl, butyl, neopentyl, 2-ethylhexyl, decyl, dodecyl, methylcyclopentyl, cyclopentyl, cyclohexyl, ethylcyclohexyl, phenyl, naphthyl, tolyl, and the like. Illustrative organoboron compounds of this invention include: trimethylboron, triethylboron, tri-n-butylboron, triisobutylboron, dibutylboron chloride, dibutylboron bromide, dibutylboron butoxide [(C$_4$H$_9$)$_2$BOC$_4$H$_9$], also known as n-butyl di-n-butylboronite], dibutylboronous anhydride [[(C$_4$H$_9$)$_2$B]$_2$O], tricyclohexylboron, dicyclohexylboron chloride, tribenzylboron, and the like. The preferred organoboron compounds are the saturated trialkylborons such as tri-n-butylboron.

The polymers which can be produced by this invention are polyethylenes and the copolymers of ethylene containing not more than about 25% by weight of a second polymerizable vinyl monomer and preferably not more than about 5% of a second polymerizable monomer. The term polymer is intended to embrace homopolymers and copolymers containing two or more monomers, such as terpolymers, etc. Similarly the term "polymerizing" refers to the process for producing both homopolymers and copolymers.

The polymerizable monomers which can be copolymerized with ethylene are the vinyl polymerizable compounds which have carbon to carbon unsaturation of the ethylenic type. These monomers can be represented by the following general formula:

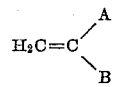

wherein A and B individually can be hydrogen, alkyl, halogen, carboxy, cycloalkyl, aryl, vinyl, cyano, acyl, acyloxy, aryloxy, carboalkyloxy, carboaryloxy, carboxy, etc. Illustrative examples of the copolymerizable monomers include: alpha olefins such as propylene, 1-butene, isobutylene, 3-methyl-1-butene, 4-methyl-1-pentene, and the like; vinyl halides such as vinyl chloride, vinyl bromide, vinyl fluoride, vinylidene chloride, allyl chloride and the like; vinyl esters such as vinyl acetate, vinyl propionate, vinyl benzoate, vinyl isobutyrate, vinyl laurate, vinyl hexanoate and the like; styrene, acrylic and methacrylic acids and their esters, nitriles, amides and anhydrides such as ethyl acrylate, methyl acrylate, methyl methacrylate, ethyl methacrylate, acrylonitrile, acrylamide and the like; and compounds having a plurality of ethylenic double bonds such as butadiene, 2-chlorobutadiene and the like.

The oxygen employed can be purified molecular oxygen or it can be in admixture with other gases, such as common air. The oxygen can be contacted with the organoboron compound to form the oxygen-treated organoboron catalyst composition prior to contact of the catalyst composition with ethylene, or it may be introduced with the ethylene, or it may be added separately after the ethylene and organoboron compound have been mixed in the reactor. The temperature and pressure at which this contact is made is not critical. The quantity of oxygen employed in the polymerization is based on the molar quantity of the organoboron compound employed. The oxygen can vary from about 0.01 to about 2.5 moles per mole of organoboron compound present and is preferably from about 0.05 to about 1.7 moles per mole of organoboron compound. The chemical structure of the oxygen-treated organoboron catalyst composition has not been ascertained but it is believed to be a transient intermediate occurring in the formation of a peroxide in the reaction of oxygen with the organoboron compound. However, it has been found as hereinafter shown in Example 9, that boron peroxides such as

do not initiate the polymerization of ethylene at the lower temperatures at which mixtures of oxygen with organoboron compounds are effective, although such peroxides are catalysts at temperatures above about 150° C. This is an indication that the catalyst is a product other than a peroxide. The ratio of oxygen-treated organoboron catalyst composition to monomer used can vary over a wide range such as from about 0.001 to about 1 mole percent of the catalyst composition based on the molar quantity of the polymerizable monomer. Preferably, however, from about 0.005 to about 0.1 mole percent of the catalyst composition is employed.

The polymerizations of this invention can be conducted over a wide range of temperatures such as from about 0° C. to about 250° C. and preferably at temperatures within the range of from about 40° C. to about 200° C. Faster rates of polymerization are obtained at the higher temperatures such as those above 160° C. or 180° C. A particular advantage in operating at lower temperatures, i.e., below about 150° C., is that the density, crystallinity and stiffness of the polyethylene produced increases as the temperature of polymerization is decreased. Thus polyethylene with a density of 0.940 g./cc. is obtained with this catalyst system at a temperature of 100° C. whereas under similar conditions but at 200° C. the density is 0.915 g./cc.

The polymerization reactions of this invention are conducted under pressure, preferably over 10,000 p.s.i. However, polymeric products can be obtained at pressures as low as 2000 p.s.i. The maximum pressure that can be used is determined only by the mechanical limitations of the equipment. Thus, pressures in excess of 100,000 p.s.i. can be used. The preferred pressure range is from about 10,000 to 60,000 p.s.i.

With the use of the oxygen-treated organoboron catalyst compositions of this invention, the polymerization can be conducted batchwise in equipment such as a stirred autoclave or a static bomb, or it may be conducted continuously in a tubular reactor.

The polymerization described herein can be carried out in bulk or in the presence of an inert diluent. The diluent can serve as a solvent for either the reactant monomer(s) or the product polymer or it can function as a suspending medium for the reactant monomer, polymer and catalyst. Illustratively, the polymerization can be carried out in water in the presence of suspending or emulsifying agents such as for example, esters of sulfonated dicarboxylic acids, e.g., dioctyl sodium sulfonsuccinate (Aerosol OT). Suitable diluents are water, saturated aliphatic hydrocarbons such as heptane, hexane, 2-ethylhexane and the like; cycloaliphatic hydrocarbons such as cyclohexane; aromatic hydrocarbons such as benzene, toluene, the xylenes and the like; and various ketones.

The melt index values given for the polymers of this invention were determined by ASTM test method D–1236–52, unless otherwise indicated. Density was measured gravimetrically by using a density gradient tube. Melting point was determined by the crossed polaroid technique.

This application is a continuation-in-part of my copending application, Serial No. 658,245 filed May 10, 1957, now abandoned.

The following examples are illustrative of the invention.

EXAMPLE 1

This example shows the effect of the addition of oxygen to tributylboron on the conversion of ethylene to polyethylene in a continuous tubular reactor. Tributylboron was dissolved in heptane and air was added to this solution to the desired mole ratio of $O_2$ to tributylboron. The oxygen-treated tributylboron catalyst composition was metered into the ethylene feed streams at a rate of 400 cc. per hour under the operating conditions shown in Table I. From the data in Table I it can be seen that increasing the molar ratio of $O_2$ to tributylboron from 0.01 (run A) to 0.19 (run B) effected the difference from a 2.7% conversion of ethylene to polyethylene to a 17.7% conversion of ethylene to polyethylene.

Table I

|  | Run A | Run B |
|---|---|---|
| Feed: |  |  |
| Wgt. feed used, gms | 4,063 | 3,801 |
| $C_2H_4$, wgt. percent on feed | 85.8 | 85.1 |
| Heptane, wgt. percent feed | 14.2 | 14.9 |
| $(C_4H_9)_3B$, mol percent on $C_2H_4$ | 0.036 | 0.037 |
| Mol Ratio, $O_2/(C_4H_9)_3B$ | 0.01 | 0.19 |
| Conditions: |  |  |
| Jacket temp., ° C | 150 | 152 |
| Pressure, p.s.i. | 20,000 | 20,000 |
| Operating time, hrs | 2 | 2 |
| Production Data: |  |  |
| Wgt. Resin, gms | 89.5 | 543 |
| Conversion, percent | 2.7 | 17.7 |
| Physical Properties: |  |  |
| Melt Index, dgm./min | 19.4 | 67.0 |
| Flow rate | 188 | -------- |
| Density, gm./cc | 0.9350 | 0.9320 |

EXAMPLE 2

This example shows that no polymerization of ethylene occurred in the presence of dibutylboron butoxide when precautions were taken to exclude oxygen from the polymerization mixture, whereas more than a 9% conversion of ethylene to polyethylene occurred when the dibutylboron butoxide was contacted with oxygen at a molar ratio of oxygen to dibutylboron butoxide of 0.28.

A 1.5 liter stainless steel autoclave was charged with 200 g. of heptane and 1.2 g. of dibutylboron butoxide. Precautions were taken to exclude air in the charging procedure. Ethylene was added to the autoclave and the mixture was heated at 50° C. for 15 minutes under a 15,000 p.s.i. pressure of ethylene. A total of 590 grams of ethylene was charged and the mol percent of boron catalyst to ethylene was 0.029%. No polymerization occurred as indicated by lack of pressure drop. Then 0.05 g. of oxygen was charged to the reactor. The molar ratio of oxygen to dibutylboron butoxide was 0.28. Polymerization began almost immediately as evidenced by a rapid drop in pressure. The unreacted ethylene was vented after a 45 minute reaction period and the white granular polyethylene produced was isolated, washed with methanol and acetone, and dried. The yield of polyethylene was 55 g. which corresponds to a 9.3% conversion; it had a density of 0.940 g./cc. and a melt index of 74 dg./min.

EXAMPLE 3

The procedure described in Example 2 was repeated using 200 g. of heptane and 1.6 g. of the anhydride of dibutylboronous acid, $[(C_4H_9)_2B]_2O$. No polymerization occurred at 50° C. under a 15,000 p.s.i. pressure prior to the injection of oxygen. Then 0.05 g. of oxygen was charged to the reactor. The molar ratio of oxygen to $[(C_4H_9)_2B]_2O$ was 0.25. At the end of 1.7 hours from the time the oxygen was added, 75 g. of polyethylene were obtained having a density of 0.9544 g./cc. and a melt index of 159 dg./min. The conversion of ethylene to polyethylene was 12.7%.

EXAMPLES 4–8

Tributylboron was dissolved in heptane and catalyst compositions were prepared by bubbling varying amounts of air into separate samples of this solution. Each catalyst solution ws metered into the ethylene feed system of a tubular reactor at rates of 200 to 400 ml. per hour to determine the effect of air on tributylboron. The polyethylene recovered from the reactor was washed three times with methanol, filtered and dried. The conditions employed and results of these examples are shown in Table II.

Table II

| Example | 4 | 5 | 6 | 7 | 8 |
|---|---|---|---|---|---|
| Feed, Total wt. (g.) | 3,800 | 3,400 | 1,900 | 3,700 | 4,200 |
| Wt. Percent Heptane+catalyst | 15 | 17 | 11 | 8 | 6 |
| Mole Percent $(C_4H_9)_3B$ on $C_2H_4$ | 0.037 | 0.011 | 0.040 | 0.009 | 0.004 |
| Ratio $O_2/(C_4H_9)_3B$ | 0.2 | 1.1 | 0.4 | 1.3 | 1.6 |
| Conditions: | | | | | |
| Temperature, °C | 150 | 150 | 100 | 150 | 200 |
| Pressure, M p.s.i. | 20 | 20 | 35 | 20 | 20 |
| Operating Time (hours) | 2.0 | 2.0 | 1.4 | 2.0 | 2.0 |
| Production Data: | | | | | |
| Conversion, Percent | 18 | 11 | 9 | 11 | 19 |
| Density, g./ml | 0.932 | 0.934 | 0.939 | 0.928 | 0.916 |
| Melt Index, dg./min | 67 | 117 | 2.5 | 0.04 | 61 |

EXAMPLE 9

This example shows that the catalytic action is probably not due to the formation of peroxides on the oxygen-treatment of the organoboron compounds.

Oxygen was passed into a one percent solution of tributylboron in benzene at 25° C. for about three hours until one equivalent of oxygen had been absorbed. The solution was then urged with nitrogen and allowed to stand for about three hours. Analysis of the resulting solution indicated that one mole equivalent of peroxide was formed per mole equivalent of tributylboron with the peroxide having the probable formula $$(C_4H_9)_2BOOC_4H_9$$

The autoclave described in Example 2 was charged with 144 g. of this boron peroxide benzene solution and 55 g. of heptane under a nitrogen atmosphere. The solution was heated to 50° C., and ethylene was added to a pressure of 15,000 p.s.i. No polymerization occurred in four hours reaction time. After cooling to room temperature and venting, the solution was again analyzed for peroxide and found to contain 80 percent of the peroxide charged. In view of the fact that no polymer was formed it is evident that the actual catalysts of this invention are not the known relatively stable boron peroxides.

EXAMPLES 10–12

One-half liter of air was bubbled through a solution of 1.1 g. of tributylboron dissolved in 200 g. of heptane. The solution was charged to a 1.5 liter stainless steel autoclave fitted with a mechanical stirrer. After purging with ethylene, a gaseous comonomer, as identified below, was pressed into the autoclave and then ethylene was added to a pressure of 15,000 p.s.i. and the autoclave was stirred and heated at 50° C. for four hours. After cooling and venting the unreacted monomers, the copolymer was recovered by filtration, washed with methanol and dried. The polymeric materials produced were true copolymers as shown by infrared analysis. The results of the runs are shown in Table III.

Table III

| Example | Ethylene, g. | Comonomer | Copolymer Yield (g.) | Density, g./cc. | Percent by weight of comonomer in copolymer |
|---|---|---|---|---|---|
| 10 | 540 | 39 g. propylene | 23 | 0.943 | 1 |
| 11 | 530 | 50 g. isobutylene | 20 | 0.934 | 2 |
| 12 | 530 | 50 g. butene-1 | 8 | 0.916 | 3 |

EXAMPLES 13–15

A catalyst solution prepared as described in Examples 10–12 was charged to an autoclave. After purging with ethylene, 580 g. of ethylene were pressed into the autoclave to a pressure of about 15,000 p.s.i., and the autoclave heated to 50° C. The indicated comonomer was added, and the contents were stirred during the reaction period. The polymer was recovered by the process described for Examples 10–12. Table IV summarizes the polymerization conditions and the physical and chemical properties of the polymers produced.

Table IV

| Example | Comonomer | Time (hrs.) | Copolymer Yield (g.) | Melt Index (dg./min.) | Density, g./cc. | Percent Ethylene in Copolymer |
|---|---|---|---|---|---|---|
| 13 | 10 g. Vinyl acetate | 4.0 | 81 | 280 | 0.944 | 97.6 |
| 14 | 9 g. Vinyl chloride | 1.3 | 75 | 532 | 0.950 | 94.9 |
| 15 | 10 g. Ethyl acrylate | 4.0 | 38 | 827 | 0.951 | 83 |

What is claimed is:

1. A process for the polymerization of ethylene which comprises contacting said ethylene at a pressure in the range of from about 2,000 to about 100,000 pounds per square inch and, at a temperature in the range of from about 0° C. to about 250° C., with from about 0.001 mole percent to about 1 mole percent, based on the molar quantity of said ethylene, of a mixture consisting of (a) an organoboron compound having the general formula:

wherein X represents a member selected from the group consisting of the halogen atoms, —$OR_2$ radicals,

radicals and —$R_2$ radicals and wherein each R, $R_1$, $R_2$ and $R_3$ represents a monovalent hydrocarbon radical, and (b) from about 0.01 mole to about 2.5 moles of oxygen per mole of said organoboron compound, and maintaining the resulting mixture within said pressure and temperature ranges for a period of time sufficient to polymerize said ethylene.

2. A process for the polymerization of ethylene which comprises contacting said ethylene, at a pressure in the range of from about 10,000 to about 60,000 pounds per square inch and at a temperature in the range of from about 0° C. to about 250° C., with from about 0.001 mole percent to about 1 mole percent based on the molar quantity of said ethylene, of a mixture consisting of (a) an organoboron compound having the general formula:

wherein X represents a member selected from the group consisting of the halogen atoms, —$OR_2$ radicals,

radicals and —$R_2$ radicals and wherein each R, $R_1$, $R_2$ and $R_3$ represents a monovalent hydrocarbon radical, and (b) from about 0.01 mole to about 2.5 moles of oxygen per mole of said organoboron compound, and maintaining the resulting mixture within said pressure and temperature ranges for a period of time sufficient to polymerize said ethylene.

3. The process for the polymerization of ethylene which comprises contacting said ethylene, at a pressure in the range of from about 10,000 to about 60,000 pounds per square inch and at a temperature in the range of from about 0° C. to about 250° C., with from about 0.005 mole percent to about 0.1 mole percent based on the molar quantity of said ethylene, of a mixture consisting of (a) an organoboron compound having the general formula:

wherein X represents a member selected from the group consisting of the halogen atoms, —OR₂ radicals,

radicals and —R₂ radicals and wherein each R, $R_1$, $R_2$ and $R_3$ represents a monovalent hydrocarbon radical, and (b) from about 0.05 mole to about 1.7 moles of oxygen per mole of said organoboron compound, and maintaining the resulting mixture within said pressure and temperature ranges for a period of time sufficient to polymerize said ethylene.

4. The process according to claim 3 wherein the organoboron compound is tributylboron.

5. The process according to claim 3 wherein the organoboron compound is dibutylboronous acid anhydride.

6. The process according to claim 3 wherein the organoboron compound is dibutylboronbutoxide.

7. A process for the copolymerization of a mixture of ethylene and up to about 25 percent by weight of at least one other polymerizable vinyl monomer which comprises contacting said mixture at a pressure in the range of from about 2,000 to about 100,000 pounds per square inch and, at a temperature in the range of from about 0° C. to about 250° C., with from about 0.001 mole percent to about 1 mole percent based on the molar quantity of said ethylene of a mixture consisting of (a) an organoboron compound having the general formula:

wherein X represents a member selected from the group consisting of the halogen atoms, —OR radicals,

radicals and —R₂ radicals and wherein each R, $R_1$, $R_2$ and $R_3$ represents a monovalent hydrocarbon radical, and (b) from about 0.1 mole to about 2.5 moles of oxygen per mole of said organoboron compound, and maintaining the resulting mixture within said pressure and temperature ranges for a period of time sufficient to copolymerize said ethylene with said other polymerizable vinyl monomer.

References Cited in the file of this patent

UNITED STATES PATENTS

| | | |
|---|---|---|
| 2,387,517 | Kraus | Oct. 23, 1945 |
| 2,691,647 | Field et al. | Oct. 12, 1954 |
| 2,825,721 | Hogan et al. | Mar. 4, 1958 |
| 2,840,590 | Muetterties | June 24, 1958 |
| 2,862,951 | Stafiej | Dec. 2, 1958 |